(12) United States Patent
Abileah et al.

(10) Patent No.: US 10,302,990 B2
(45) Date of Patent: May 28, 2019

(54) DISPLAY CELL STRUCTURE AND DISPLAY DEVICE USING QUANTUM DOT

(71) Applicant: a.u. Vista, Inc., Milpitas, CA (US)

(72) Inventors: Adiel Abileah, Milpitas, CA (US); Fang-Chen Luo, Milpitas, CA (US)

(73) Assignee: A.U. VISTA, INC., Milpitas, CA (US)

( * ) Notice: Subject to any disclaimer, the term of this patent is extended or adjusted under 35 U.S.C. 154(b) by 0 days.

(21) Appl. No.: 15/660,159

(22) Filed: Jul. 26, 2017

(65) Prior Publication Data

US 2019/0033655 A1    Jan. 31, 2019

(51) Int. Cl.
G02F 1/1335 (2006.01)

(52) U.S. Cl.
CPC .. G02F 1/133516 (2013.01); G02F 1/133512 (2013.01); G02F 1/133528 (2013.01); *G02F 2001/133548* (2013.01)

(58) Field of Classification Search
CPC ......... G02F 1/133617; G02F 1/133514; G02F 1/133512; G02F 1/133621; G02F 1/133603; G02F 1/133528; G02F 1/1335; G02F 1/1336; G02F 1/13762; G02F 1/1333; G02F 1/133602; G02F 1/133609; G02F 2001/133614; G02F 2001/134345; G02F 2001/01791; G02F 2001/133548; G02F 2001/133622; G02F 2202/36; G02F 2201/52; B82Y 20/00; B82Y 30/00; B82Y 40/00; H01L 27/3211; H01L 27/3213;

(Continued)

(56) References Cited

U.S. PATENT DOCUMENTS 9,507,206 B2    11/2016  Li
2013/0300986 A1*  11/2013  Kang ................... G02B 5/3058
                                                                       349/96

(Continued)

FOREIGN PATENT DOCUMENTS

CN    105044974 A    11/2015
CN    105093682 A    11/2015

(Continued)

OTHER PUBLICATIONS

Office Action issued by (TIPO) Intellectual Property Office Ministry of Economic Affairs R.O.C. dated Feb. 25, 2019 for Application No. 107119212, Taiwan.

*Primary Examiner* — Thoi V Duong
(74) *Attorney, Agent, or Firm* — Tim Tingkang Xia, Esq.; Locke Lord LLP

(57) ABSTRACT

A display cell structure and a display device using quantum dot structures are provided. The display cell structure includes a first polarizer and a second polarizer spaced apart from each other, and a liquid crystal layer disposed therebetween, defining red (R), green (G) and blue (B) subpixels. A color plate structure is disposed on the second polarizer, and multiple cavities or indents are formed on the color plate structure, including first cavities or indents aligned to the red (R) subpixels and second cavities or indents aligned to the green (G) subpixels. The first cavities or indents are filled with a red quantum dot or quantum rod material, and the second cavities or indents are filled with a green quantum dot or quantum rod material. A filter layer is partially disposed to be located adjacent to the first cavities or indents and the second cavities or indents.

20 Claims, 14 Drawing Sheets

(58) Field of Classification Search
CPC ............ H01L 51/5012; H01L 51/5036; H01L 21/02601; H01L 21/02603; H01L 21/02606; H01L 2251/5369; H01L 33/06; H01L 33/504; H01L 31/035218; G02B 5/201; G02B 6/0073; C01B 32/15; G09G 2300/0452

See application file for complete search history.

(56) References Cited

U.S. PATENT DOCUMENTS

| | | |
|---|---|---|
| 2013/0335799 A1 | 12/2013 | Yoon et al. |
| 2015/0301408 A1 | 10/2015 | Li |
| 2017/0255055 A1* | 9/2017 | Liang ................ G02F 1/133621 |
| 2018/0046022 A1 | 2/2018 | Morita et al. |
| 2018/0213170 A1 | 7/2018 | Segawa et al. |

FOREIGN PATENT DOCUMENTS

| | | |
|---|---|---|
| CN | 105182594 A | 12/2015 |
| CN | 105204104 A | 12/2015 |
| CN | 105223724 A | 1/2016 |
| CN | 105589250 A | 5/2016 |
| TW | 201643513 A | 12/2016 |
| TW | 201713970 A | 4/2017 |
| WO | 2017022935 A1 | 9/2017 |

* cited by examiner

DISPLAY CELL STRUCTURE AND DISPLAY DEVICE USING QUANTUM DOT

FIELD

The disclosure relates generally to display technology, and more particularly to a display cell structure and a display device using quantum dot or quantum rod structures.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A liquid crystal display (LCD) is a non-emissive display which utilizes a separate backlight unit to emit light, and red (R), green (G) and blue (B) color filters for pixels to display a color image on a screen. In some cases, the backlight is white, and each of the three color filters are absorbing other colors except for the corresponding color, which is a narrow part of the spectrum. In order to get wide color gamut, the filters have to transmit very narrow spectra. When the spectra becomes narrower, the primary colors are more saturated.

In order to improve the saturation (higher color gamut), the use of quantum dot (QD) matrix was implemented. The QD molecules are absorbing light with shorter wavelength (e.g. deep blue 450 nm) and emits, after conversion, light with a longer wavelength. Depending on the molecular physical size, the emission may be green (e.g. 550 nm) or red (e.g. 640 nm). The narrow spectra together with high quantum efficiency make the QD an attractive solution. QD materials like nano spheres (e.g. Cadmium) coated with a shell had be used, and other materials like Perovskites or phosphorous materials are also being developed.

The configuration that people are using today include blue LEDs as light source and either tubes filled with the green and red QDs near the light sources, or a films with the QDs material underneath the LCD, next to the diffusers of the backlight. A third option is to put the QDs adjacent to the blue LEDs in the same package. However, this is challenging, since the heat generated by the LED is too high for the QDs to survive.

The above solutions (QD tubes, QD films, or QD LEDs) are making a white color backlight with good gamut, after passing the color filters. Typically the gamut of the display with a backlight having white LEDs (~72%), is increasing to 92%-NTSC or higher with the QDs. However, to generate a white color, only part of the light (about ⅓) is passing to the viewer. Thus, it will be much more efficient to put the QDs after the LCD pixels and omit the color filters. However, if the QDs are positioned away from the pixels, a leakage from a neighbor pixel can activate the QDs diagonally. A problem with this concept is the parallax issue.

Therefore, a heretofore unaddressed need exists in the art to address the aforementioned deficiencies and inadequacies.

SUMMARY

One aspect of the disclosure relates to a display cell structure, which includes a first polarizer and a second polarizer spaced apart from each other; an active plate disposed on the first polarizer and facing the second polarizer; a liquid crystal layer disposed between the first polarizer and the second polarizer and having liquid crystal molecules, the liquid crystal layer defining a plurality of pixels, wherein each of the plurality of pixels comprises a red (R) subpixel, a green (G) subpixel, and a blue (B) subpixel; a color plate structure disposed on the second polarizer, wherein a plurality of first cavities or indents is formed on the color plate structure to be aligned to the red (R) subpixels of the plurality of pixels, and a plurality of second cavities or indents is formed on the color plate structure to be aligned to the green (G) subpixels of the plurality of pixels, and wherein each of the plurality of first cavities or indents is filled with a red quantum dot or quantum rod material, and each of the plurality of second cavities or indents is filled with a green quantum dot or quantum rod material; and a filter layer partially disposed to be located adjacent to the plurality of first cavities or indents and the plurality of second cavities or indents of the color plate structure, such that the filter layer covers the red quantum dot or quantum rod material and the green quantum dot or quantum rod material.

In certain embodiments, the display cell structure is being used in a display device having a blue light source emitting blue light, wherein the first polarizer is configured to face the blue light source.

A further aspect of the disclosure relates to a display device, which includes a blue light source configured to emit blue light, and a display cell structure. The display cell structure includes: a first polarizer facing the blue light source; a second polarizer spaced apart from the first polarizer; an active plate disposed on the first polarizer and facing the second polarizer; a liquid crystal layer disposed between the first polarizer and the second polarizer and having liquid crystal molecules, the liquid crystal layer defining a plurality of pixels, wherein each of the plurality of pixels comprises a red (R) subpixel, a green (G) subpixel, and a blue (B) subpixel; a color plate structure disposed on the second polarizer, wherein a plurality of first cavities is formed on the color plate structure to be aligned to the red (R) subpixels of the plurality of pixels, and a plurality of second cavities is formed on the color plate structure to be aligned to the green (G) subpixels of the plurality of pixels, and wherein each of the plurality of first cavities is filled with a red quantum dot or quantum rod material, and each of the plurality of second cavities is filled with a green quantum dot or quantum rod material; and a filter layer partially disposed to be located adjacent to the plurality of first cavities and the plurality of second cavities of the color plate structure, such that the filter layer covers the red quantum dot or quantum rod material and the green quantum dot or quantum rod material.

In certain embodiments, no cavity or indent is formed on the color plate structure to be aligned to the blue (B) subpixels of the plurality of pixels.

In certain embodiments, the color plate structure includes: a glass layer disposed by the second polarizer such that the second polarizer is between the liquid crystal layer and the glass layer, wherein the plurality of first cavities or indents and the plurality of second cavities or indents are formed on the glass layer; and a color plate disposed on the glass layer; wherein the filter layer is partially disposed between the color plate and the glass layer to be adjacent to the plurality of first cavities or indents and the plurality of second cavities or indents of the glass layer.

In certain embodiments, the glass layer is laminated to the color plate.

In certain embodiments, the display cell structure further includes: a black matrix layer partially disposed between the color plate and the glass layer, such that the black matrix layer covers areas not aligned to the red (R) subpixels, the green (G) subpixels, and the blue (B) subpixels of the plurality of pixels.

In certain embodiments, the second polarizer is a wire-grid polarizer having a wire-grid layer facing the glass layer. In certain embodiments, the display cell structure further includes: a common electrode layer formed between the wire-grid polarizer and the liquid crystal layer, wherein the common electrode layer is formed by indium tin oxide.

In certain embodiments, the second polarizer is a wire-grid polarizer having a wire-grid layer facing the liquid crystal layer.

In certain embodiments, the filter layer is a yellow filter layer.

In certain embodiments, the color plate structure is disposed on the second polarizer facing the liquid crystal layer; the plurality of first cavities or indents and the plurality of second cavities or indents are formed on a surface the color plate structure adjacent to the liquid crystal layer; and the filter layer is partially disposed in the plurality of first cavities or indents and the plurality of second cavities or indents.

In certain embodiments, the color plate structure is disposed on the second polarizer facing the liquid crystal layer; the plurality of first cavities or indents and the plurality of second cavities or indents are formed on a surface the color plate structure adjacent to the liquid crystal layer; and the filter layer is partially disposed between the second polarizer and the color plate structure.

In certain embodiments, the color plate structure is disposed on the second polarizer such that the second polarizer is between the liquid crystal layer and the color plate structure; and the plurality of first cavities or indents and the plurality of second cavities or indents are formed on a surface the color plate structure adjacent to the second polarizer.

In certain embodiments, the color plate structure is disposed on the second polarizer such that the second polarizer is between the liquid crystal layer and the color plate structure; and the plurality of first cavities or indents and the plurality of second cavities or indents are formed on a surface the color plate structure facing an outer environment.

In a further aspect of the disclosure, a method for forming a display cell structure is provided, which includes: providing a first polarizer and a second polarizer; forming a color plate structure having a plurality of first cavities or indents and a plurality of second cavities or indents, wherein the plurality of first cavities or indents is formed on the color plate structure to be aligned to a plurality of red (R) subpixels of a plurality of pixels of the display cell structure, and the plurality of second cavities or indents is formed on the color plate structure to be aligned to a plurality of green (G) subpixels of the plurality of pixels; disposing a filter layer on the color plate structure, such that the filter layer is partially disposed to be adjacent to the plurality of first cavities or indents and the plurality of second cavities or indents of the color plate structure; filling a red quantum dot or quantum rod material in each of the plurality of first cavities or indents; filling a green quantum dot or quantum rod material in each of the plurality of second cavities or indents; laminating the second polarizer to the color plate structure to seal the plurality of first cavities or indents and the plurality of second cavities or indents of the color plate structure; disposing the second polarizer opposite to and spaced apart from the first polarizer; forming an active plate on the first polarizer facing the second polarizer; and filling liquid crystal molecules between the active plate and the second polarizer to form a liquid crystal layer, wherein the liquid crystal layer defines the plurality of pixels, and each of the plurality of pixels comprises one of the red (R) subpixels, one of the green (G) subpixels, and a blue (B) subpixel.

In certain embodiments, the second polarizer is a wire-grid polarizer.

In certain embodiments, the color plate structure includes a glass layer disposed by the second polarizer such that the second polarizer is between the liquid crystal layer and the glass layer, wherein the plurality of first cavities or indents and the plurality of second cavities or indents are formed on the glass layer; and a color plate disposed on the glass layer, wherein the filter layer is partially disposed between the color plate and the glass layer to be adjacent to the plurality of first cavities or indents and the plurality of second cavities or indents of the glass layer.

In certain embodiments, the method includes: disposing the filter layer on the color plate; forming the glass layer having the plurality of first cavities or indents and the plurality of second cavities or indents; and laminating the glass layer to the color plate, such that the filter layer is located adjacent to the plurality of first cavities or indents and the plurality of second cavities or indents of the glass layer.

In certain embodiments, the method further includes: forming a black matrix layer on the glass layer facing the color plate, such that the black matrix layer covers areas not aligned to the red (R) subpixels, the green (G) subpixels, and the blue (B) subpixels of the plurality of pixels.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION OF THE DISCLOSURE

Figure 1:
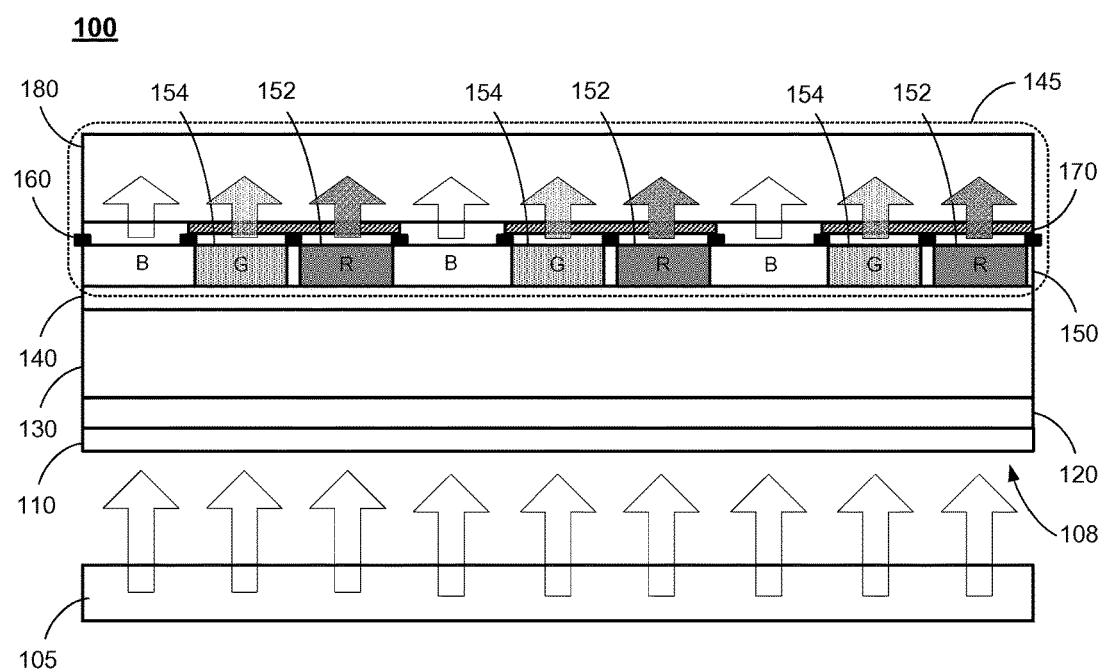
FIG. 1 schematically shows a display device according to certain embodiments of the present disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this disclosure, in certain aspects, relates to a light control device and a display device using the same.

As disclosed above, the parallax issue in the LCD using QD matrix is a problem to be solved. In order to solve the parallax problem, the inventors proposed a solution by putting patterned QDs next to the pixels. In certain embodiments, this can be done by adding cavities or indents to a top glass (such as the color glass) next to the pixels to host the QDs. Using the top glass having these cavities, the QDs may be adjacent to the pixels, and light leakage from neighbor pixels will be minimal. This will be done for the green-QDs and red-QDs, while the blue light will pass through the corresponding pixels without the QDs. The green and red QDs will be protected from the ambient light with a yellow filter layer.

In certain embodiments, a display cell structure, which utilizes a glass layer to host the QDs to solve the parallax problem, may be used in a display device having a blue light source emitting blue light. FIG. 1 schematically shows a display device according to certain embodiments of the present disclosure. As shown in FIG. 1, the display device 100 includes a blue light source 105, which is used to emit blue light, and a display cell structure 108. The display cell structure 108 includes a first polarizer 110, an active plate 120, a liquid crystal layer 130, a second polarizer 140, and a color plate structure 145. In certain embodiments, the color plate structure 145 includes a glass layer 150, a black matrix layer 160, a yellow filter layer 170, and a color plate 180. In certain embodiments, the display cell structure 108 may further include other components not shown in FIG. 1. For example, the display cell structure 108 may include a plurality of transparent substrates, such that the components of the display cell structure 108 may be formed on the transparent substrates.

The blue light source 105 is a light source for emitting blue light toward the display cell structure 108. The wavelength of the blue light is in the range of about 440-460 nm. Generally, the blue light source 105 may be disposed at the back side of the display device 100 as a backlight structure. In certain embodiments, the blue light source 105 may include light emitting devices. For example, the blue light source 105 may include a plurality of blue light emitting diodes (LEDs) to emit the blue light. In certain embodiments, the blue light source 105 may further include light guiding or distributing structures that enable the blue light being emitted to be distributed evenly toward the display cell structure 108. For example, the blue light source 105 may include a light guide plate (LGP), which may be used to distribute the blue light evenly toward the display cell structure. In certain embodiments, the blue light source 105 may further include reflective and diffusive structures such as granulated diffuser, BEF, DBEF, holographic diffuser, or any other structures that may include the light efficiency of the blue light source 105.

The first polarizer 110 and the second polarizer 140 are positioned to be spaced apart from each other. In certain embodiments, the second polarizer 140 may be a wire-grid polarizer (WGP). It should be noted that the second polarizer 140 is located in an internal position of the stack of the display cell structure, and is thus an "internal" polarizer. The active plate 120, sometimes also referred to as the active matrix glass plate which includes the driving electronic components and bus lines to activate the display pixels, is disposed on the first polarizer 110 facing the second polarizer 140. The liquid crystal layer 130 is disposed in the cell gap between the active plate 120 and the second polarizer 140 and has liquid crystal molecules. In certain embodiments, the liquid crystal layer 130 defines a plurality of pixels, and each pixel may include a plurality of subpixels. For example, as shown in FIG. 1, the display device 100 is a RGB color display device, and each pixel includes a red (R) subpixel, a green (G) subpixel, and a blue (B) subpixel.

The glass layer 150 is a thin glass layer formed on the second polarizer 140, facing an outer environment. As shown in FIG. 1, the glass layer 150 includes a plurality of cavities, including first cavities 152 and second cavities 154. Each of the first cavities 152 is located to be aligned with a corresponding red (R) subpixel, and is filled with a red quantum dot material. Each of the second cavities 154 is located to be aligned with a corresponding green (G) subpixel, and is filled with a green quantum dot material. In certain embodiments, the shape and size of each of the cavities (i.e., the first cavities 152 and second cavities 154) may be identical. In contrast, there is no cavity or indent formed on the glass layer 150 to be aligned to the blue (B) subpixels. In other words, the red and green quantum dot materials are positioned in the first cavities 152 and the second cavities 154 of the glass layer 150 to correspond to the red (R) and green (G) subpixels respectively, and there is no quantum dot material corresponding to the blue (B) subpixels. In certain embodiments, it is preferred that the materials chosen as the red and green quantum dot materials should be the materials with properties such as minimum dispersion. In certain embodiments, the quantum dot materials used above can also be replaced with quantum rod materials to minimize the dispersion of polarization orientation if quantum rod molecules are aligned in the direction same as the orientation of the polarization.

The black matrix layer 160 is partially disposed between the color plate 180 and the glass layer 150, such that the black matrix layer 160 covers areas not aligned to the red (R) subpixels, the green (G) subpixels, and the blue (B) subpixels. In certain embodiments, the black matrix layer 160 may be a black material being coated on the glass layer 150 in a pattern, which covers the areas not aligned to the red (R) subpixels, the green (G) subpixels, and the blue (B) subpixels. In other words, the black matrix layer 160 covers the area around the red and green QD materials (which correspond to the R and G subpixels) and the area around the no-cavity area of the glass layer 150 (i.e., the open area corresponding to the B subpixels). In certain embodiments, the black matrix layer 160 may be used to cover the bus-lines and the transistors, such as the thin-film transistors (TFT) located in the corner of the sub-pixels.

The yellow filter layer 170 is a high-pass filter layer which is provided to protect the red and green QD materials from being activated by the ultraviolet (UV) and blue regions of the ambient light. Typically, the yellow filter layer 170 may be formed with a high pass filter material with a transmission T of above 85% (T>85%) in the green and red regions (e.g., about 520-640 nm), and very low transmission (e.g., T<1%) below 510 nm (e.g., in the range of about 380-510 nm). As shown in FIG. 1, the yellow filter layer 170 is partially disposed between the color plate 180 and the glass layer 150, such that the yellow filter layer 170 is located adjacent to the first cavities 152 and the second cavities 154 of the glass layer 130. In this way, the yellow filter layer 170 covers the red quantum dot material filled in the first cavities 152 and the green quantum dot material filled in the second cavities 154. It should be noted that there is no quantum dot material to be aligned to the blue (B) subpixels. Thus, there is no need to provide the yellow filter layer 170 corresponding to the no-cavity area of the glass layer 150 (i.e., the open area corresponding to the B subpixels).

The color plate 180 is a passive plate facing the outer environment. In certain embodiments, since the QD materials are provided, traditional resin color filter materials such as red, green or blue resin color filters are not needed in the color plate 180.

In operation, when the blue light source 105 emits the blue light toward the display cell structure, the red QD material filled in the first cavities 152 of the glass layer 150 will be excited by the blue light to emit red light, and the green QD material filled in the second cavities 154 of the glass layer 150 will be excited by the blue light to emit green light. For the no-cavity area of the glass layer 150 (i.e., the open area corresponding to the B subpixels), the blue light will pass through the glass layer 150 and maintain blue light.

In certain embodiments, the thickness of the glass layer 150 is limited to the order of about 0.01 mm~0.1 mm, such that the parallax between the pixels and the red and green quantum dot materials may be minimized. Further, the first cavities 152 and the second cavities 154 of the glass layer 150 may be formed as indents, and may be formed by a variety of processes, such as etching or laser drilling the glass layer 150, or any other cavity forming process. In certain embodiments, the shape of each of the first cavities 152 and the second cavities 154 of the glass layer 150 may be varied. For example, the first cavities 152 and the second cavities 154 may be through holes, trapezoids, or in faceted or curved shapes, or in any other shape that enables the red and green QD materials to be filled therein.

Figure 2:
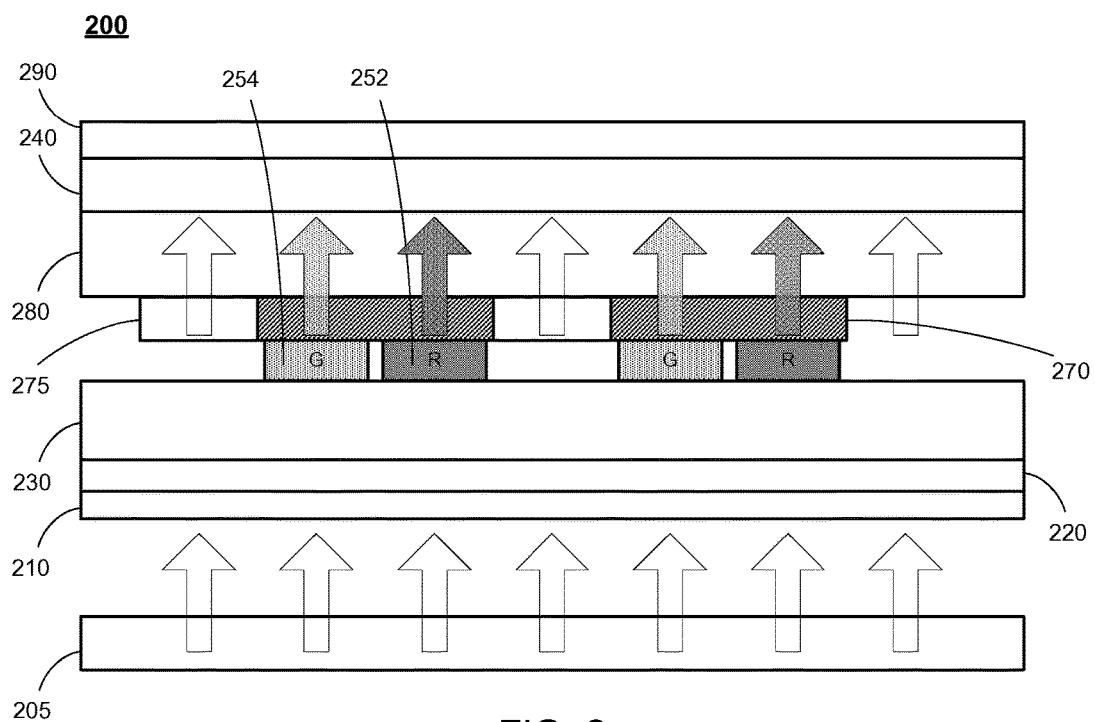
FIG. 2 schematically shows a display device without the glass layer having cavities according to certain embodiments of the present disclosure.

As shown in FIG. 1, the glass layer 150 with the first cavities 152 and the second cavities 154 is used to host the red and green quantum dot materials. The reason of using the glass layer 150 with the first cavities 152 and the second cavities 154 is to solve the parallax problem and to maintain planarization of the display cell structure. FIG. 2 schematically shows a display device without the glass layer having cavities according to certain embodiments of the present disclosure. In comparison with the display device 100 as shown in FIG. 1, the bottom half of the display device 200 as shown in FIG. 2 has a similar structure, including a blue light source 205, a first polarizer 210, an active plate 220 and a liquid crystal layer 230, which are similar to the blue light source 105, the first polarizer 110, the active plate 120 and the liquid crystal layer 130 as shown in FIG. 1. However, at the top of the display device 200, a color plate 280 is facing the liquid crystal layer 230, and a second polarizer 240 is at a different, opposite side of the color plate 280 from the liquid crystal layer 230, facing the outer environment. In other words, the second polarizer 240 in the display device 200 is not an "internal" polarizer. Further, a UV layer 290 is disposed on the second polarizer 240. Moreover, there is no glass layer in the display device 200. Instead, a plurality of quantum dot structures, including the red quantum dot structures 252 and the green quantum dot structures 254 are provided at the bottom of the color plate 280 facing the liquid crystal layer 230, and a yellow filter layer 270 is disposed between the color plate 280 and the quantum dot structures (i.e., the red quantum dot structures 252 and the green quantum dot structures 254). The red quantum dot structures 252 are located to be aligned to the red subpixels, and the green quantum dot structures 254 are located to be aligned to the green subpixels. In certain embodiments, a plurality of spacing structures 275 may be positioned at the locations to be aligned to the blue subpixels (i.e., at the open space between the parts of the yellow filter layer 270). In certain embodiments, the spacing structures 275 are formed by a transparent material, which should have similar dispersion or scattering properties to the QDs, so that the viewing angles for the area where the spacing structures 275 are located and the areas where the quantum dot structures (i.e., the red quantum dot structures 252 and the green quantum dot structures 254) are located will be the same to the viewer.

As shown in FIG. 2, in the structure of the display device 200, the yellow filter layer 270 and the quantum dot structures (i.e., the red quantum dot structures 252 and the green quantum dot structures 254) directly face the liquid crystal layer 230. Thus, the thickness of the yellow filter layer 270 and the quantum dot structures (i.e., the red quantum dot structures 252 and the green quantum dot structures 254) may cause the problem to maintain planarization for a proper cell gap in the liquid crystal layer 230.

Figure 3A:
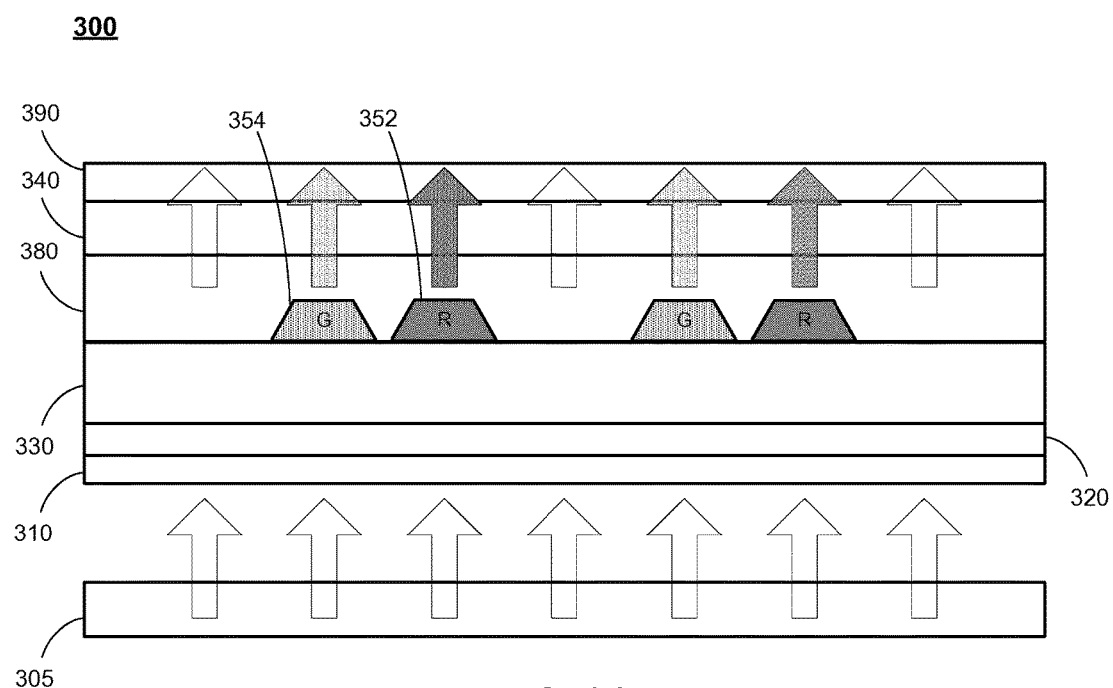
FIG. 3A schematically shows a display device with quantum dot structures formed in the indents of the color plate according to certain embodiments of the present disclosure.

To solve the problem in the display device 200 as shown in FIG. 2, a modified structure is proposed to form indents on the color plate to host the quantum dot structures and/or the yellow filter layer. FIG. 3A schematically shows a display device with quantum dot structures formed in the indents of the color plate according to certain embodiments of the present disclosure. In comparison with the display device 200 as shown in FIG. 2, the display device 300 as shown in FIG. 3A includes a blue light source 305, a first polarizer 310, an active plate 320, a liquid crystal layer 330, a color plate 380, a second polarizer 340 and a UV layer 390, which are similar to the blue light source 205, the first polarizer 210, the active plate 220, the liquid crystal layer 230, the color plate 280, the second polarizer 240 and the UV layer 290 as shown in FIG. 2. The difference of the display device 300 as shown in FIG. 3 exists at the bottom of the color plate 380, where a plurality of indents may be formed to host the red quantum dot structures 352 and the green quantum dot structures 354. In other words, the first cavities (in which red quantum dot structures 252 are filled) as shown in FIG. 2 are replaced by the first indents (in which red quantum dot structures 352 are filled) as shown in FIG. 3A, and the second cavities (in which green quantum dot structures 254 are filled) as shown in FIG. 2 are replaced by the second indents (in which green quantum dot structures 354 are filled) as shown in FIG. 3A. However, it should be noted that no yellow filter layer is provided in the display device 300 as shown in FIG. 3A.

Figure 3B:
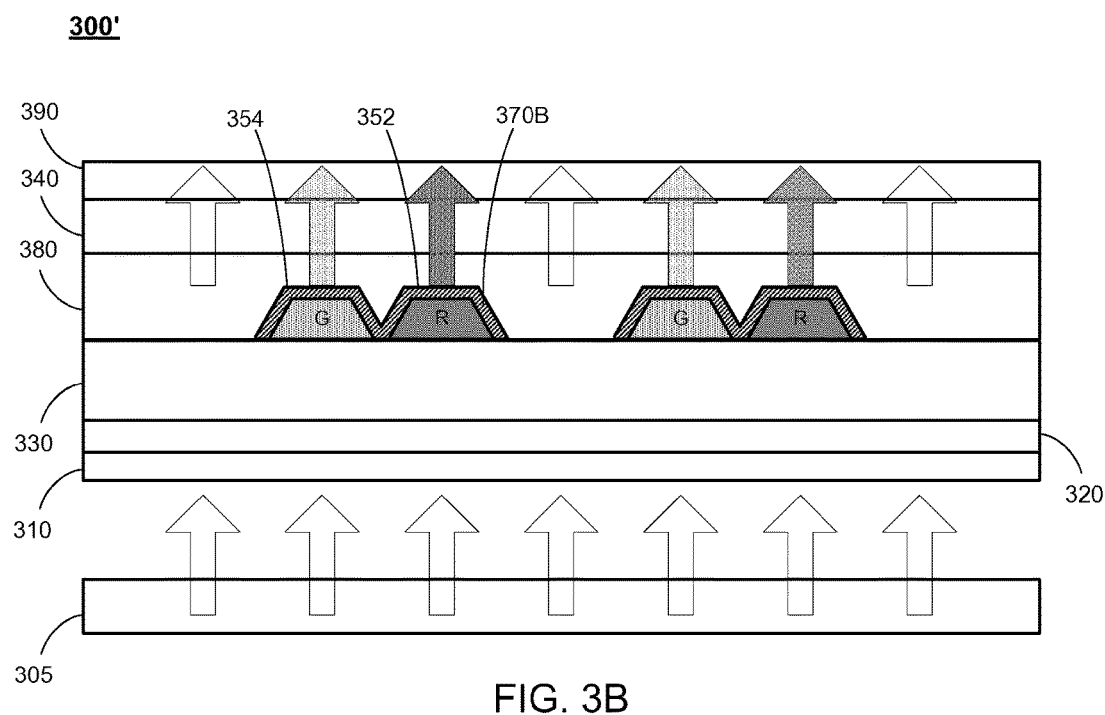
FIG. 3B schematically shows a display device with quantum dot structures and yellow filter layer structures formed in the indents of the color plate according to certain embodiments of the present disclosure.

To add the yellow filter layer in the display device 300 as shown in FIG. 3A, FIG. 3B schematically shows a display device with quantum dot structures and yellow filter layer structures formed in the indents of the color plate according to certain embodiments of the present disclosure. In the display device 300' as shown in FIG. 3B, the indents formed at the bottom of the color plate 380 may be enlarged, such that a plurality of yellow filter layer structures 370B may be formed inside the indents between the quantum dot structures (i.e., the red quantum dot structures 352 and the green quantum dot structures 354) and the color plate 380. In this case, the indents of the color plate 380 host the quantum dot structures (i.e., the red quantum dot structures 352 and the green quantum dot structures 354) as well as the yellow filter layer structures 370B.

Figure 3C:
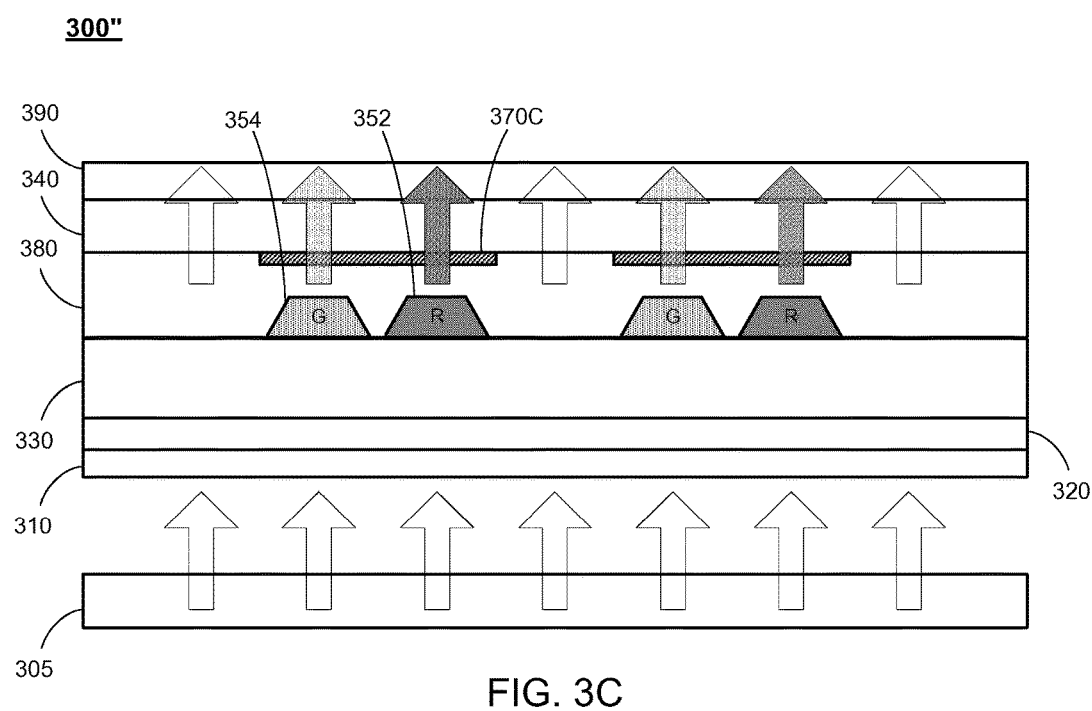
FIG. 3C schematically shows a display device with quantum dot structures formed in the indents of the color plate, and a yellow filter layer formed between the color plate and the second polarizer, according to certain embodiments of the present disclosure.

In another case, FIG. 3C schematically shows a display device with quantum dot structures formed in the indents of the color plate, and a yellow filter layer formed between the color plate and the second polarizer, according to certain embodiments of the present disclosure. In the display device 300" as shown in FIG. 3C, the indents formed at the bottom of the color plate 380 does not have to be enlarged. Instead, a yellow filter layer 370C may be formed between the color plate 380 and the second polarizer 340. In this case, the indents of the color plate 380 host only the quantum dot structures (i.e., the red quantum dot structures 352 and the green quantum dot structures 354).

By comparing the display devices 300' and 300" as shown in FIGS. 3B and 3C, the display device 300' as shown in FIG. 3B gives lower parallax effect and better overall performance. However, implementation of the display device 300' as shown in FIG. 3B is more complex and might be more expensive, because the yellow filter layer structures 370B and the quantum dot structures (i.e., the red quantum dot structures 352 and the green quantum dot structures 354) must be disposed inside the indents of the color plate 380. In comparison, the display device 300" as shown in FIG. 3C is easier to implement. However, it has the disadvantage of some parallax problem. The parallax problem in the display device 300" as shown in FIG. 3C may not be critical because some angles will cut little light from the blue sub-pixels, which is not expected to reduce the blue light significantly. Further, in low resolution, the parallax effect of the display device 300" as shown in FIG. 3C may be minimal. Nevertheless, the parallax problem exists in the display device 300" as shown in FIG. 3C.

In certain embodiments, other consideration in the implementation of the proposed indents of the color plate as shown in FIGS. 3A-3C must be taken care of in order to maintain the polarization mode of the display devices. For example, there should be minimal diffusing effect, which is scattering the polarization. Further, the yellow filter layer 370B/370C must have smooth surfaces during deposition and does not scatter the light. Specifically, scattering should occur in neither the blue light nor the QD (green and red) emission.

Figure 4:
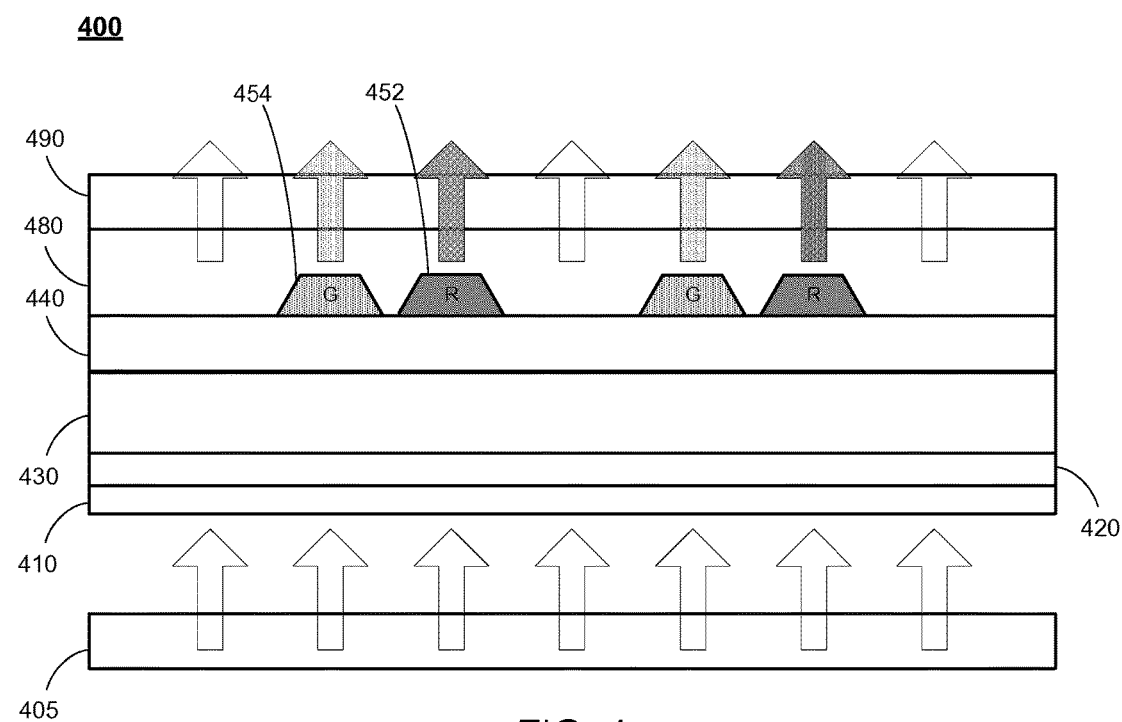
FIG. 4 schematically shows a display device with quantum dot structures formed in the indents of the color plate and an internal polarizer according to certain embodiments of the present disclosure.

In certain embodiments, to address the problem in the display devices as shown in FIGS. 3A-3C, a further modified structure of the display device is shown in FIG. 4, which schematically shows a display device with quantum dot structures formed in the indents of the color plate and an internal polarizer according to certain embodiments of the present disclosure. In comparison with the display device 300 as shown in FIG. 3A, difference of the display device 400 as shown in FIG. 4 exists at the locations of the color plate 480 and the second polarizer 440. Specifically, the second polarizer 440 is located between the color plate 480 and the liquid crystal layer 430, such that the blue light passes through the second polarizer 440 before reaching the color plate 480. In this case, the second polarizer 440 is an "internal" polarizer, which may survive the liquid crystal process, and the UV layer 490 is disposed on the color plate 480. Other components of the display device 400 as shown in FIG. 4, such as the blue light source 405, the first polarizer 410, an active plate 420, a liquid crystal layer 430, and the quantum dot structures (i.e., the red quantum dot structures 452 and the green quantum dot structures 454), are similar to the blue light source 305, the first polarizer 310, the active plate 320, the liquid crystal layer 330, and the quantum dot structures (i.e., the red quantum dot structures 352 and the green quantum dot structures 354) as shown in FIG. 3A. Further, although FIG. 4 does not show a yellow filter layer, the yellow filter layer may be added at the locations as shown in either FIG. 3B or FIG. 3C. The configuration as shown in FIG. 4 may solve the issues with de-polarization coming from the quantum dot structures (i.e., the red quantum dot structures 452 and the green quantum dot structures 454) and/or the yellow filter layer.

Figure 5:
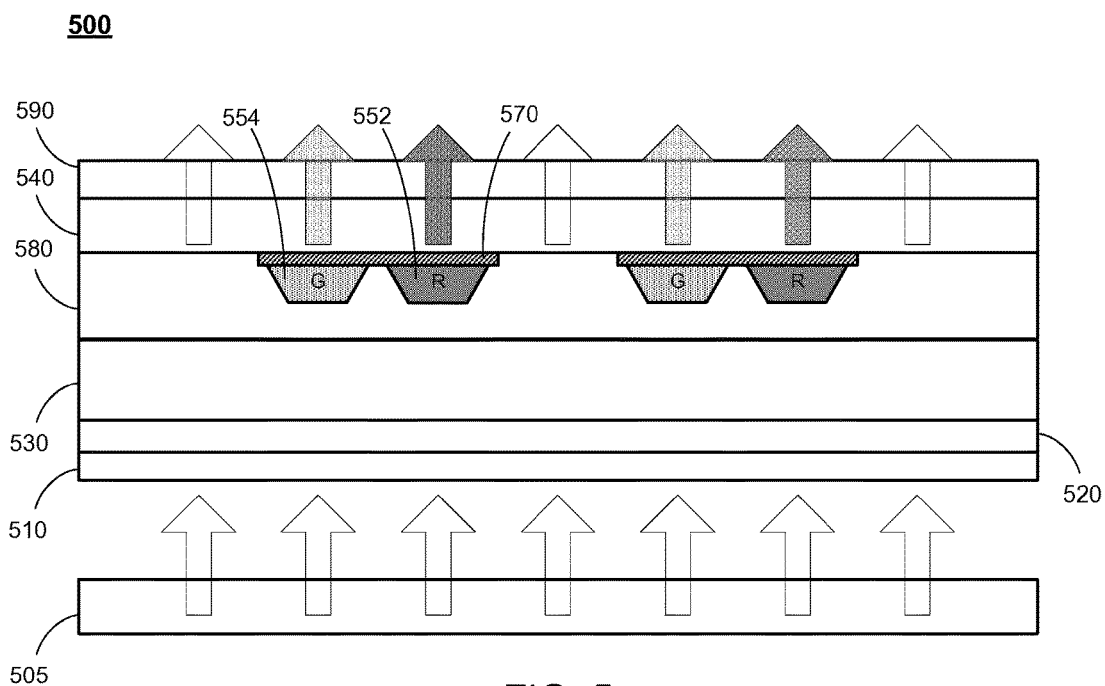
FIG. 5 schematically shows a display device with quantum dot structures formed in the indents at an outer surface of the color plate according to certain embodiments of the present disclosure.

In certain embodiments, to address the problem in the display devices as shown in FIGS. 3A-3C, a further modified structure of the display device is shown in FIG. 5, which schematically shows a display device with quantum dot structures formed in the indents at an outer surface of the color plate according to certain embodiments of the present disclosure. In comparison with the display device 300 as shown in FIG. 3A, difference of the display device 400 as shown in FIG. 4 exists at the locations of the indents, which are formed at the top surface (i.e., the outer surface facing the outer environment) of the color plate 480. Further, the yellow filter layer 570 is formed at the top of the indents, covering the quantum dot structures (i.e., the red quantum dot structures 552 and the green quantum dot structures 554), which is similar to the location of the yellow filter layer 370C as shown in FIG. 3C. Other components of the display device 500 as shown in FIG. 5, such as the blue light source 505, the first polarizer 510, an active plate 520, a liquid crystal layer 530, the second polarizer 540 and the UV layer 590 are similar to the blue light source 305, the first polarizer 310, the active plate 320, the liquid crystal layer 330, the second polarizer 340 and the UV layer 390 as shown in FIG. 3A. The advantages of the configuration as shown in FIG. 5 include an easier manufacturing process. However, the configuration may still have the disadvantage of some parallax issue. Therefore, this configuration will be limited to lower resolution structures, where the parallax effect is minimal.

In comparison to all the display device configurations as shown in FIGS. 2-5, the display device 100 as shown in FIG. 1 has the advantage of having minimal parallax and an easier manufacturing process. Specifically, instead of forming the indents on the color plate as shown in FIGS. 3A-3C, 4 and 5, the glass layer 150 with cavities may be used. In certain embodiments, the yellow filter layer 170 may be coated on the color plate 180. For example, the color plate 180 may include micro indents, and the yellow filter layer 170 may be coated in the micro indents. In certain embodiments, the coating process may include, without being limited thereto, spraying yellow filter materials on the color plate 180 and wiping out the excess material, inkjet printing, spin coating, or other coating process. After filling the quantum dot materials in the cavities 152 and 154, the glass layer 150 may be laminated to the color plate 180 (with the yellow filter layer 170 coated thereon) and the second polarizer 140 to seal the cavities. In this case, the QD materials can be protected from the environment, mostly from humidity.

In certain embodiments, the second polarizer 140 as shown in FIG. 1 may be made from an organic material. In certain embodiments, the second polarizer 140 as shown in FIG. 1 may be a WGP, which may have a thinner thickness and be more stable to survive the liquid crystal process.

In certain embodiments, to increase the strength of the structure, a very thin protective glass cover may be laminated over the glass layer 150 with the cavities as shown in FIG. 1. In certain embodiments, when the WGP is used as the second polarizer 140, the WGP is generally formed by a wire-grid layer deposited on a glass sheet. Thus, the glass sheet of the WGP may function as the protective glass. This protective glass should serve also a planarization layer, such that then the LC assembly is done, the alignment layers will be in a plane, and maintain the precision of the cell gap.

FIGS. 6A-6L schematically show an assembly process of a display device according to certain embodiments of the present disclosure. It should be particularly noted that, unless otherwise stated in the disclosure, some or all of the steps of the assembly process of the display device may be arranged in a different sequential order, and are thus not limited to the sequential order as shown in FIGS. 6A-6L. In certain embodiments, additional steps may be added to the assembly process to obtain the best fit of the liquid crystal assembly and to protect the QD properties.

Figure 6A:
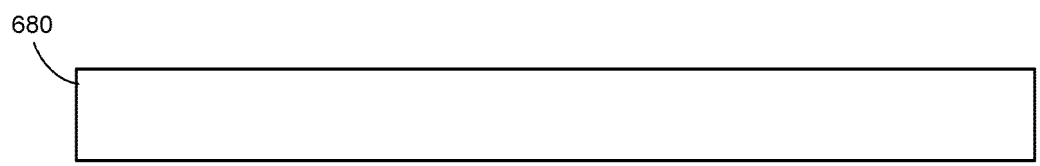
FIGS. 6A-6L schematically show an assembly process of a display device according to certain embodiments of the present disclosure.
Figure 6B:
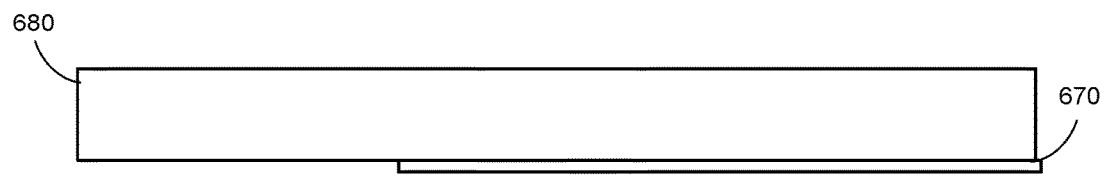

As shown in FIG. 6A, a color plate 680 is provided. As shown in FIG. 6B, the yellow filter layer 670 is deposited at the bottom of the color plate 680.

Figure 6C:
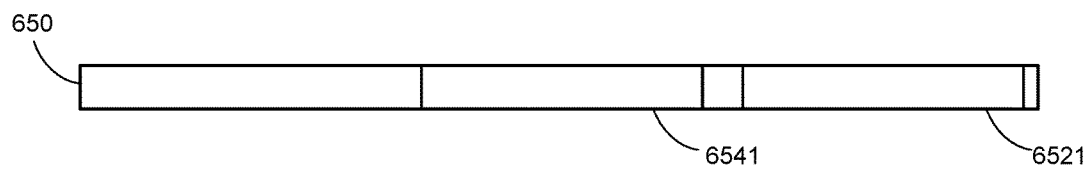
Figure 6D:
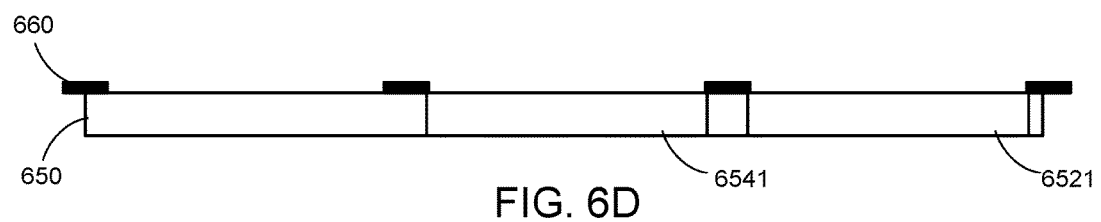

As shown in FIG. 6C, the glass layer 650 with the first cavities 6521 and the second cavities 6541 may be provided. As shown in FIG. 6D, the black matrix layer 660 may be patterned on the top of the glass layer 650. In certain embodiments, the black matrix layer 660 is specifically patterned such that the black matrix layer 660 covers areas not aligned to the red (R) subpixels, the green (G) subpixels, and the blue (B) subpixels of the pixels. As shown in FIG.

Figure 6E:
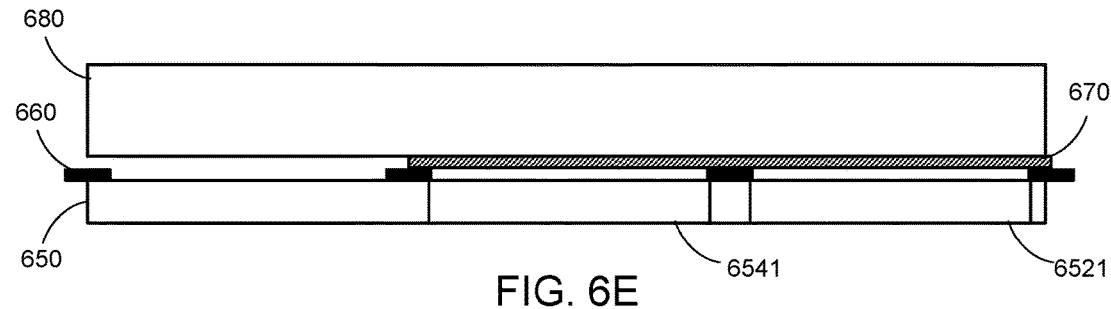

6E, the top of the glass layer 650 is laminated to the bottom of the color plate 680. In certain embodiments, the yellow filter layer 670 is specifically patterned such that when the glass layer 650 with the cavities is laminated at the bottom of the color plate 680, the yellow filter layer 670 may be adjacent to the plurality of first cavities 6521 and the plurality of second cavities 6541 of the glass layer 650. It should be noted that the first cavities 6521 and the second cavities 6541 of the glass layer 650 are still empty (i.e., not filled with the QD materials) as shown in FIG. 6E when the glass layer 650 is laminated to the color plate 680. In certain embodiments, the registration of the locations of yellow filter layer 670 with the first cavities 6521 and the second cavities 6541 must be ensured in the laminating process.

Figure 6F:
Figure 6G:
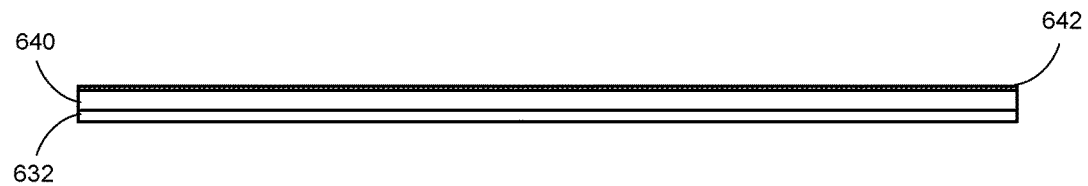

As shown in FIG. 6F, a WGP is provided as the second polarizer 640. In certain embodiments, the WGP 640 has a wire-grid layer 642 facing the glass layer 650. As shown in FIG. 6G, a common electrode layer 632 is formed at the bottom of the WGP 640. In certain embodiments, the common electrode layer 632 is formed by indium tin oxide (ITO) or other materials suited for the common electrode.

Figure 6H:
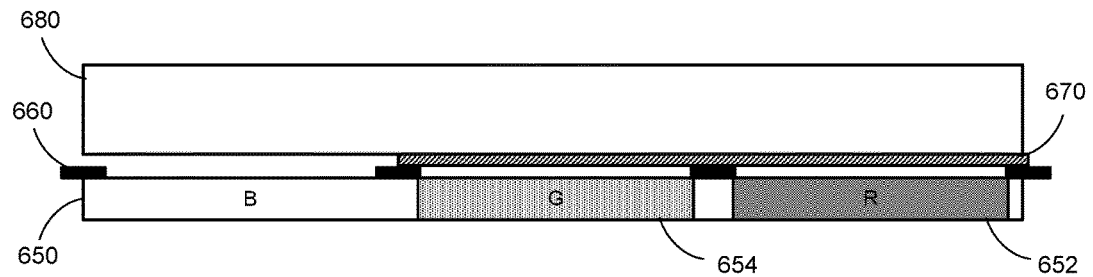

As shown in FIG. 6H, the red quantum dot material 652 may be filled in the first cavities 6521, and the green quantum dot material 654 may be filled in the second cavities 6541. It should be noted that, although FIG. 6H shows that the openings of the first cavities 6521 and the second cavities 6541 are in a face-down position, the actually filling process of the quantum dot materials may be performed with the openings of the first cavities 6521 and the second cavities 6541 facing upwards.

Figure 6I:
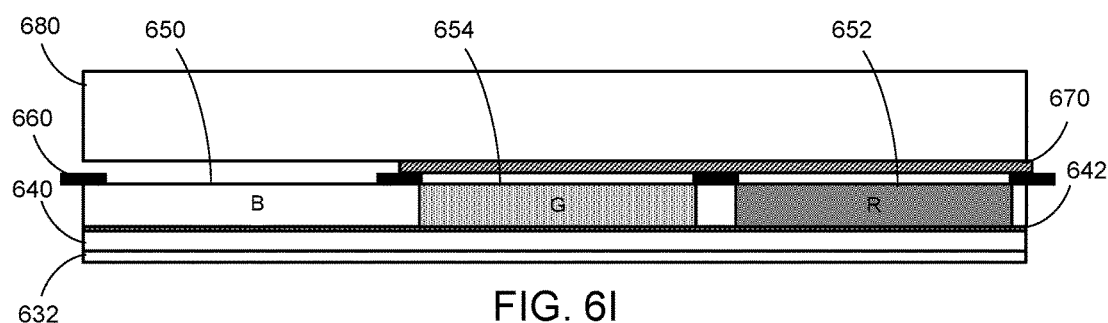
Figure 6J:
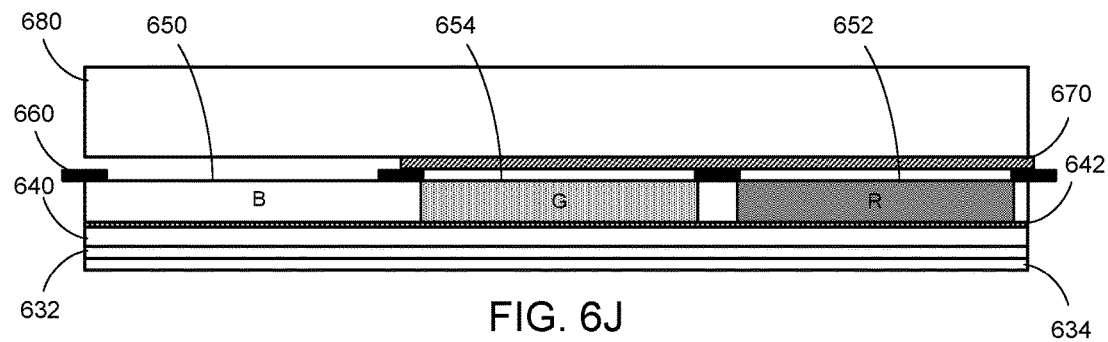

As shown in FIG. 6I, the WGP 640 is laminated to the bottom of the structure as shown in FIG. 6H, such that the wire-grid layer 642 of the WGP 640 faces the glass layer 650 and seals the quantum dot materials 652 and 654 filled in the first cavities 6521 and the second cavities 6541. Optionally, as shown in FIG. 6J, an alignment layer 634 may be deposited on the common electrode layer 632. In certain embodiments, the alignment layer 634 may be formed by a polyimide (PI) material. In certain embodiments, after depositing the alignment layer 634, a further alignment process may be performed to the alignment layer 634 to match the liquid crystal process.

Figure 6K:
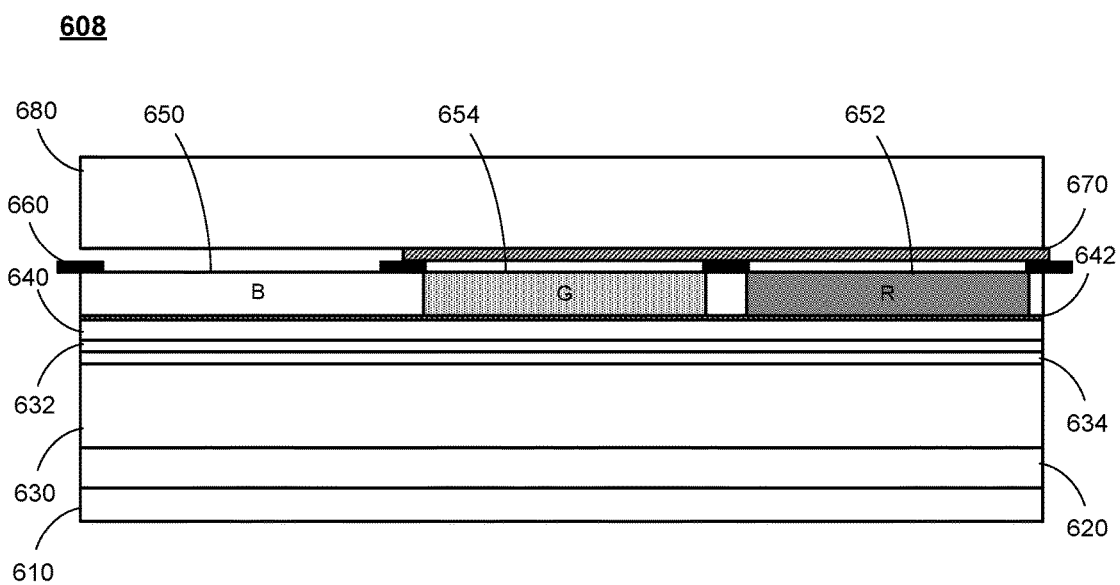
Figure 6L:
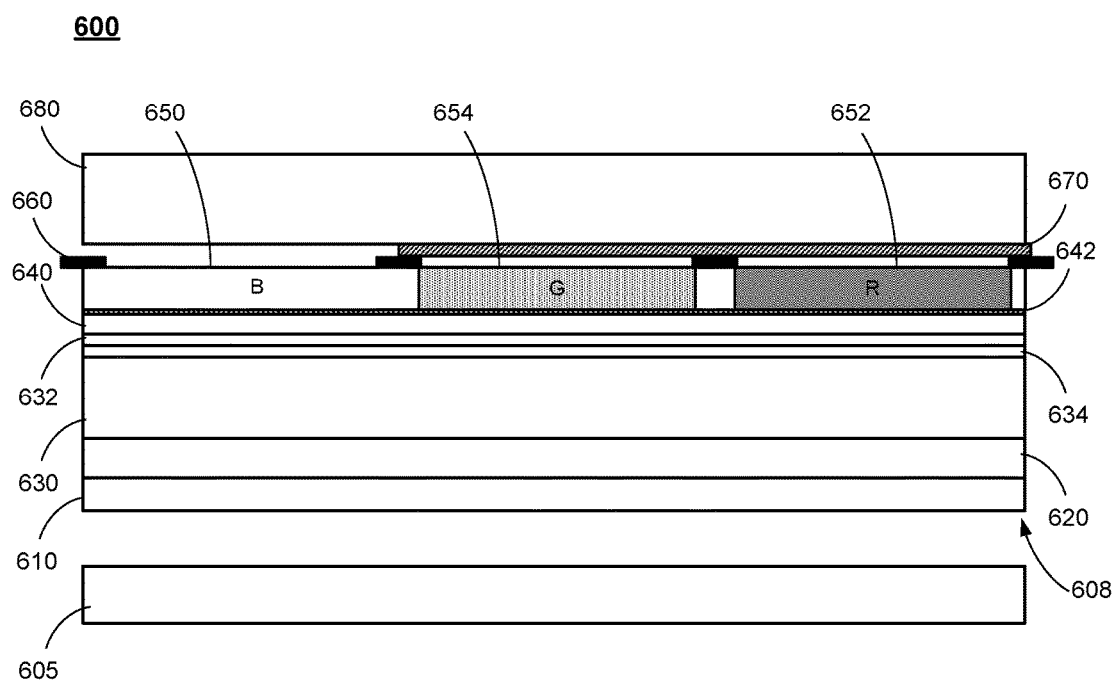

As shown in FIG. 6K, a further assembly process may be performed to the structure as shown in FIG. 6J, such that the structure is further positioned to be opposite to and spaced apart from the first polarizer 610. Then, an active plate 620 may be formed on the first polarizer 610 to face the wire-grid polarizer 640, and liquid crystal molecules may be filled between the active plate 620 and the wire-grid polarizer 640 to form a liquid crystal layer 630. In certain embodiments, the assembly process may be performed by assembling the structure as shown in FIG. 6J with the active plate 620, and then laminating the first polarizer 610 to the active plate 620. In certain embodiments, the structure may run with the regular liquid crystal process during the assembly process. In this case, a display cell structure 608 is formed. As shown in FIG. 6L, a blue light source 605 may be added to the display cell structure 608 to complete the display device 600.

In certain embodiments, the display device 600 as shown in FIG. 6L has the advantages of: (a) minimum parallax (since the QD materials are close to the R and G subpixels) and (b) minimum loss of polarization, since the QD materials are located after the internal polarizer 640). It should be noted that, in some cases, the internal polarizer 640 may be located at an outer location (e.g., on top of the color plate 780 facing the outer environment) if other means to minimize the de-polarization effects of the QD materials may apply.

Figure 7:
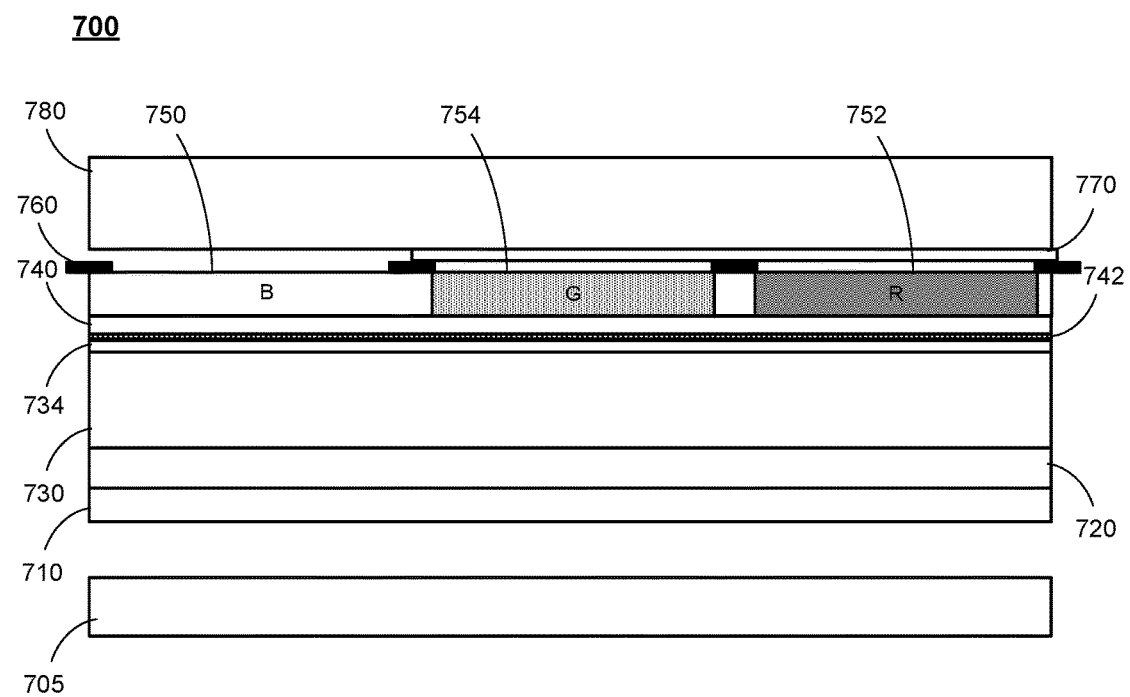
FIG. 7 schematically shows a display device having an internal polarizer according to certain embodiments of the present disclosure.

In certain embodiments, the display device 600 as shown in FIG. 6L may be further modified to simplify the manufacturing and assembly steps. For example, FIG. 7 schematically shows a display device having an internal polarizer according to certain embodiments of the present disclosure, where the wire-grid layer of the internal polarizer faces the liquid crystal layer. Specifically, as shown in FIG. 7, the second polarizer 740 is a WGP having a wire-grid layer 742 facing downwards to the liquid crystal layer 730. In this case, the wire-grid layer 742 of the WGP 740 may function as the common electrode, which makes an additional common electrode layer unnecessary. Thus, the alignment layer 734 may be deposited directly on the WGP 740. Other components of the display device 700 as shown in FIG. 7, such as the blue light source 705, the first polarizer 710, the active plate 720, the liquid crystal layer 730, the glass layer 750, the quantum dot structures (i.e., the red quantum dot structures 752 and the green quantum dot structures 754), the black matrix layer 760, the yellow filter layer 770 and the color plate 780, are similar to the blue light source 605, the first polarizer 610, the active plate 620, the liquid crystal layer 630, the quantum dot structures (i.e., the red quantum dot structures 652 and the green quantum dot structures 654), the black matrix layer 660, the yellow filter layer 670 and the color plate 680 as shown in FIG. 6L.

In certain embodiments, the display device 700 as shown in FIG. 7 has the advantages of: (a) minimum parallax (since the QD materials are close to the R and G subpixels) and (b) minimum loss of polarization, since the QD materials are located after the internal polarizer 640). Further, since there is no need to provide an addition common electrode layer, the manufacturing and assembly steps may be further reduced.

In certain embodiments, in the WGP 640 as shown in FIG. 6L and the WGP 740 as shown in FIG. 7, the glass layer carrying the wire-grid layer 642/742 may be thin (e.g., about 100 um) and laminated to the glass layer 650/750 with the cavities, which may also be thin in the order of 0.01-0.1 mm or more. In this case, the parallax between the pixels and the QDs may be minimized.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A display cell structure, comprising:
a first polarizer and a second polarizer spaced apart from each other;
an active plate disposed on the first polarizer, the active plate facing the second polarizer;

a liquid crystal layer disposed between the active plate and the second polarizer and having liquid crystal molecules, the liquid crystal layer defining a plurality of pixels, wherein each of the plurality of pixels comprises a red (R) subpixel, a green (G) subpixel, and a blue (B) subpixel;

a color plate structure disposed on the second polarizer, wherein a plurality of first cavities or indents is formed on the color plate structure to be aligned to the red (R) subpixels of the plurality of pixels, and a plurality of second cavities or indents is formed on the color plate structure to be aligned to the green (G) subpixels of the plurality of pixels, and wherein each of the plurality of first cavities or indents is filled with a red quantum dot or quantum rod material, and each of the plurality of second cavities or indents is filled with a green quantum dot or quantum rod material; and a filter layer partially disposed to be adjacent to the plurality of first cavities or indents and the plurality of second cavities or indents of the color plate structure, such that the filter layer covers the red quantum dot or quantum rod material and the green quantum dot or quantum rod material, wherein no cavity or indent is formed on the color plate structure to be aligned to the blue (B) subpixels of the plurality of pixels.

2. The display cell structure of claim 1, being used in a display device having a blue light source emitting blue light, wherein the first polarizer is configured to face the blue light source.

3. The display cell structure of claim 1, wherein the color plate structure comprises:

a glass layer disposed by the second polarizer such that the second polarizer is between the liquid crystal layer and the glass layer, wherein the plurality of first cavities or indents and the plurality of second cavities or indents are formed on the glass layer; and a color plate disposed on the glass layer;

wherein the filter layer is partially disposed between the color plate and the glass layer to be adjacent to the plurality of first cavities or indents and the plurality of second cavities or indents of the glass layer.

4. The display cell structure of claim 3, wherein the glass layer is laminated to the color plate.

5. The display cell structure of claim 3, further comprising:

a black matrix layer partially disposed between the color plate and the glass layer, such that the black matrix layer covers areas not aligned to the red (R) subpixels, the green (G) subpixels, and the blue (B) subpixels of the plurality of pixels.

6. The display cell structure of claim 3, wherein the second polarizer is a wire-grid polarizer having a wire-grid layer facing the glass layer.

7. The display cell structure of claim 6, further comprising:

a common electrode layer formed between the wire-grid polarizer and the liquid crystal layer, wherein the common electrode layer is formed by indium tin oxide.

8. The display cell structure of claim 3, wherein the second polarizer is a wire-grid polarizer having a wire-grid layer facing the liquid crystal layer.

9. The display cell structure of claim 1, wherein the filter layer is a yellow filter layer.

10. The display cell structure of claim 1, wherein:

the color plate structure is disposed on the second polarizer facing the liquid crystal layer;

the plurality of first cavities or indents and the plurality of second cavities or indents are formed on a surface of the color plate structure adjacent to the liquid crystal layer; and the filter layer is partially disposed in the plurality of first cavities or indents and the plurality of second cavities or indents.

11. The display cell structure of claim 1, wherein:

the color plate structure is disposed on the second polarizer facing the liquid crystal layer;

the plurality of first cavities or indents and the plurality of second cavities or indents are formed on a surface of the color plate structure adjacent to the liquid crystal layer; and the filter layer is partially disposed between the second polarizer and the color plate structure.

12. The display cell structure of claim 1, wherein:

the color plate structure is disposed on the second polarizer such that the second polarizer is between the liquid crystal layer and the color plate structure; and the plurality of first cavities or indents and the plurality of second cavities or indents are formed on a surface of the color plate structure adjacent to the second polarizer.

13. The display cell structure of claim 1, wherein:

the color plate structure is disposed on the second polarizer such that the second polarizer is between the liquid crystal layer and the color plate structure; and the plurality of first cavities or indents and the plurality of second cavities or indents are formed on a surface of the color plate structure facing an outer environment.

14. A method for forming a display cell structure, comprising:

providing a first polarizer and a second polarizer;

forming a color plate structure having a plurality of first cavities or indents and a plurality of second cavities or indents, wherein the plurality of first cavities or indents is formed on the color plate structure to be aligned to a plurality of red (R) subpixels of a plurality of pixels of the display cell structure, the plurality of second cavities or indents is formed on the color plate structure to be aligned to a plurality of green (G) subpixels of the plurality of pixels, and no cavity or indent is formed on the color plate structure to be aligned to the blue (B) subpixels of the plurality of pixels;

disposing a filter layer on the color plate structure, such that the filter layer is partially disposed to be adjacent to the plurality of first cavities or indents and the plurality of second cavities or indents of the color plate structure;

filling a red quantum dot or quantum rod material in each of the plurality of first cavities or indents;

filling a green quantum dot or quantum rod material in each of the plurality of second cavities or indents;

laminating the second polarizer to the color plate structure to seal the plurality of first cavities or indents and the plurality of second cavities or indents of the color plate structure;

disposing the second polarizer opposite to and spaced apart from the first polarizer;

forming an active plate on the first polarizer facing the second polarizer; and filling liquid crystal molecules between the active plate and the second polarizer to form a liquid crystal layer, wherein the liquid crystal layer defines the plurality of pixels, and each of the plurality of pixels comprises one of the red (R) subpixels, one of the green (G) subpixels, and a blue (B) subpixel.

15. The method of claim 14, wherein the second polarizer is a wire-grid polarizer.

16. The method of claim 15, wherein the wire-grid polarizer has a wire-grid layer facing a glass layer of the color plate structure, and the method further comprises:
forming a common electrode layer on the wire-grid polarizer facing the liquid crystal layer,
wherein the common electrode layer is formed by indium tin oxide.

17. The method of claim 15, wherein the wire-grid polarizer has a wire-grid layer facing the liquid crystal layer.

18. The method of claim 14, wherein the color plate structure comprises:
a glass layer disposed by the second polarizer such that the second polarizer is between the liquid crystal layer and the glass layer, wherein the plurality of first cavities or indents and the plurality of second cavities or indents are formed on the glass layer; and
a color plate disposed on the glass layer,
wherein the filter layer is partially disposed between the color plate and the glass layer to be adjacent to the plurality of first cavities or indents and the plurality of second cavities or indents of the glass layer.

19. The method of claim 18, wherein no cavity or indent is formed on the glass layer to be aligned to the blue (B) subpixels of the plurality of pixels.

20. The method of claim 18, comprising:
disposing the filter layer on the color plate;
forming the glass layer having the plurality of first cavities or indents and the plurality of second cavities or indents; and
laminating the glass layer to the color plate, such that the filter layer is located adjacent to the plurality of first cavities or indents and the plurality of second cavities or indents of the glass layer.

\* \* \* \* \*